(12) United States Patent
Madge et al.

(10) Patent No.: US 8,469,664 B2
(45) Date of Patent: Jun. 25, 2013

(54) YAW BEARING ASSEMBLY AND TOWER FOR WIND TURBINE

(75) Inventors: James Henry Madge, Simpsonville, SC (US); Adam Daniel Minadeo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/315,371

(22) Filed: Dec. 9, 2011

(65) Prior Publication Data
US 2012/0134841 A1   May 31, 2012

(51) Int. Cl.
*F03D 7/02*   (2006.01)
(52) U.S. Cl.
USPC .......................................... 416/9; 416/244 R
(58) Field of Classification Search
USPC ................... 416/9, 170 R, 174, 244 R, 245 R
See application file for complete search history.

(56) References Cited

U.S. PATENT DOCUMENTS

| 4,435,646 | A | * | 3/1984 | Coleman et al. | 290/44 |
| 2009/0250939 | A1 | * | 10/2009 | Curme | 290/55 |
| 2010/0092120 | A1 | * | 4/2010 | Nies et al. | 384/513 |

FOREIGN PATENT DOCUMENTS
WO   WO 2008/152083   12/2008

* cited by examiner

*Primary Examiner* — Nathaniel Wiehe
*Assistant Examiner* — Adam W Brown
(74) *Attorney, Agent, or Firm* — Dority & Manning PA

(57) ABSTRACT

A tower for a wind turbine is disclosed. The tower includes an outer shell defining a yaw axis and a main frame for a nacelle. The tower further includes a first yaw bearing and a second yaw bearing each connecting the outer shell and the main frame. The first yaw bearing and the second yaw bearing are spaced apart from each other along the yaw axis and each rotatable about the yaw axis.

17 Claims, 3 Drawing Sheets

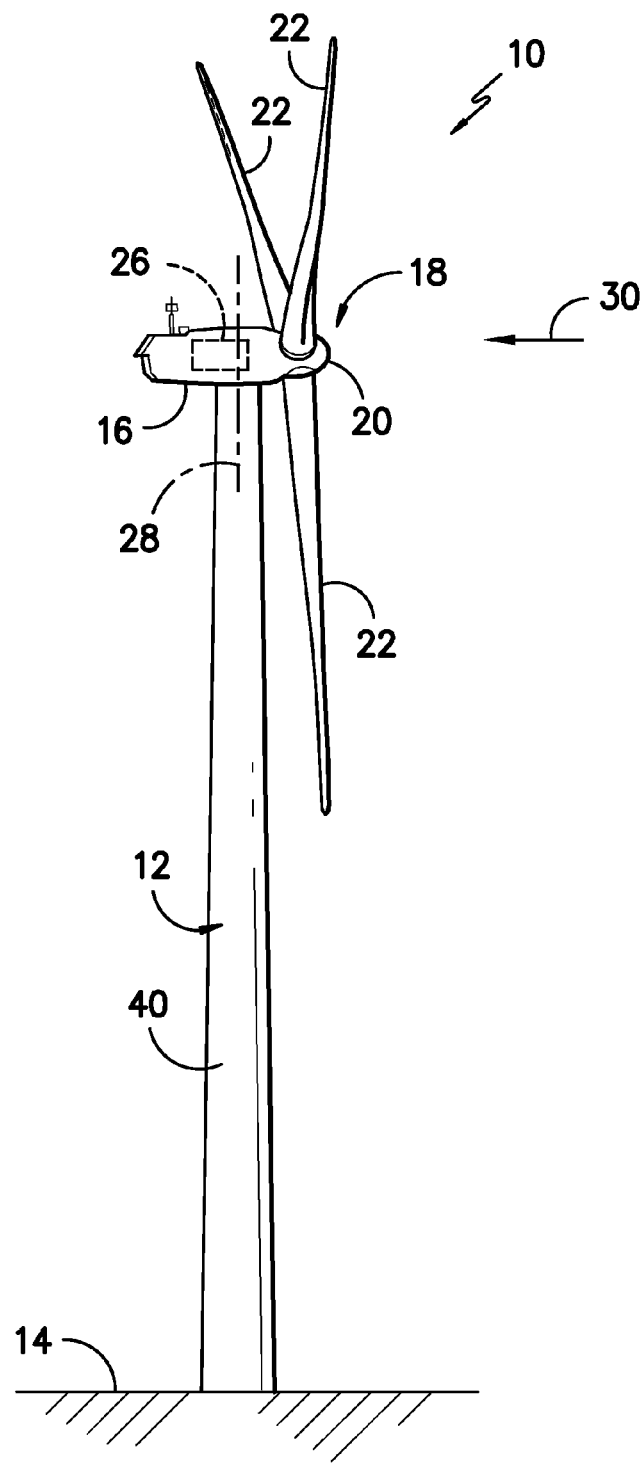
FIG. —1—

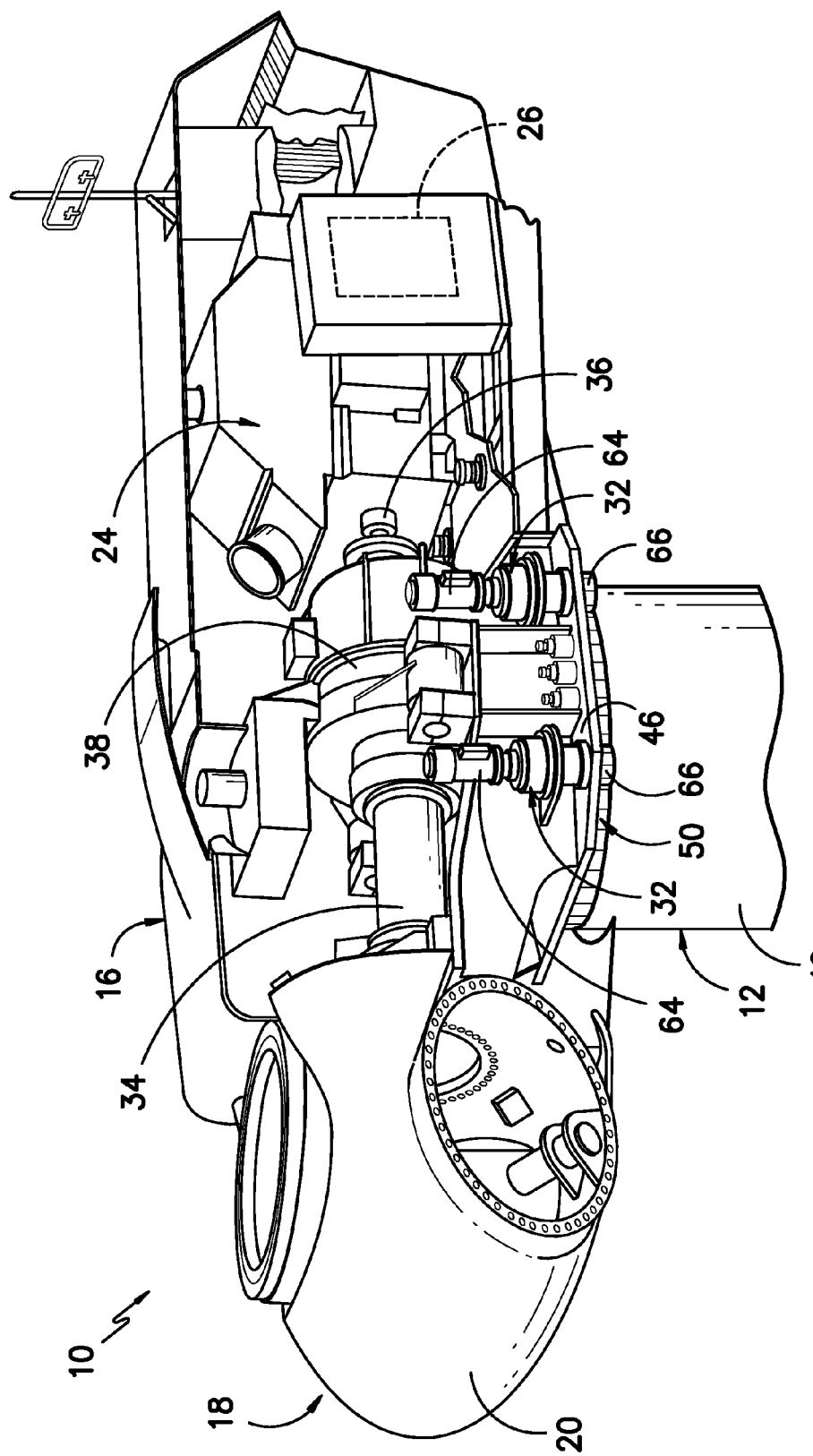
FIG. -2-

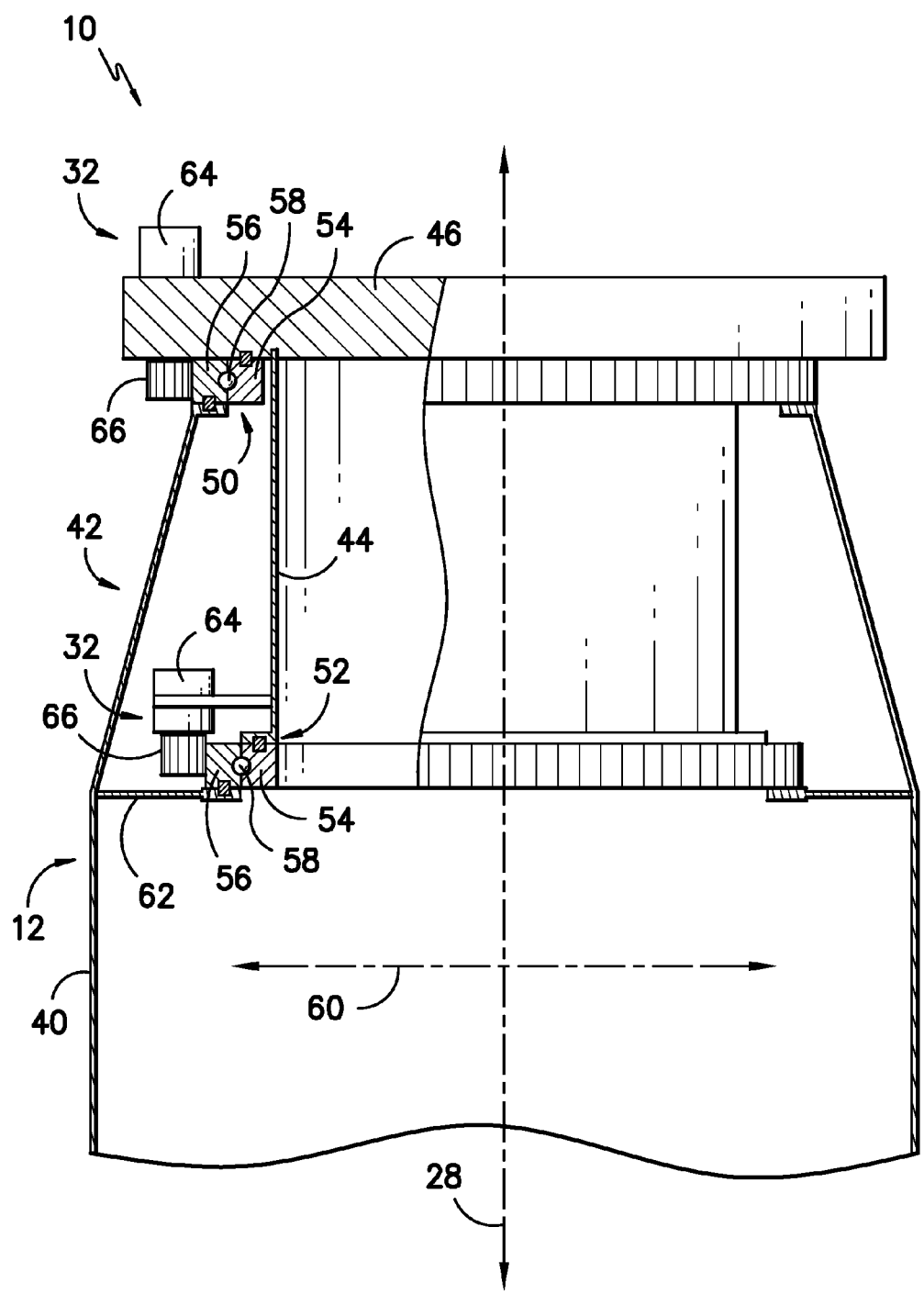
FIG. -3-

YAW BEARING ASSEMBLY AND TOWER FOR WIND TURBINE

FIELD OF THE INVENTION

The present subject matter relates generally to yaw bearing assemblies and towers for wind turbines and, more particularly, to yaw bearing assemblies and towers including more than one yaw bearing.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

To properly orient the rotor blades relative to the direction of the wind, wind turbines typically include one or more yaw drive mechanisms configured to engage a single yaw bearing for rotating the nacelle relative to the tower. As wind turbines continue to increase in size, this yaw bearing must similarly increase in size. However, a yaw bearing of such increased size may be impractical and/or disproportionately expensive. For example, the yaw bearing of a larger wind turbine may be subjected to increased loading. In order for the yaw bearing to withstand such loading, it must include various components that can adequately react the increased loads. Thus, for example, two, three, or more rows of bearing balls may be included in a yaw bearing. However, such increase in the number and rows of bearing balls may be prohibitively expensive.

Additionally, the use of a single yaw bearing in a wind turbine may result in increased load peaks. This is because the loads that the yaw bearing is subjected to are reacted over concentrated areas of the bearing. Load peaking describes load distribution, such as between the various bearing balls of a bearing. A high load peak means that the load on the most highly loaded component, such as a bearing ball, is higher than the average load on all components. More efficient load transfer is thus obtained when load peaks are reduced. Thus, the yaw bearings of larger wind turbines must account for such increased load peaks, which can compound the impracticability and expense of the yaw bearing.

Accordingly, a wind turbine with an improved yaw bearing assembly would be desired in the art. For example, a yaw bearing assembly that provides improved distribution of loads would be advantageous.

BRIEF DESCRIPTION OF THE INVENTION

Aspects and advantages of the invention will be set forth in part in the following description, or may be obvious from the description, or may be learned through practice of the invention.

In one embodiment, a yaw bearing assembly for a wind turbine tower is disclosed. The tower includes an outer shell defining a yaw axis and a main frame for a nacelle. The yaw bearing assembly includes a first yaw bearing and a second yaw bearing. Each of the first and second yaw bearings is configured to connect the outer shell and the main frame. The first yaw bearing and the second yaw bearing are spaced apart from each other along the yaw axis and each rotatable about the yaw axis.

In another embodiment, a tower for a wind turbine is disclosed. The tower includes an outer shell defining a yaw axis and a main frame for a nacelle. The tower further includes a first yaw bearing and a second yaw bearing each connecting the outer shell and the main frame. The first yaw bearing and the second yaw bearing are spaced apart from each other along the yaw axis and each rotatable about the yaw axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective, interior view of one embodiment of a nacelle and tower of a wind turbine according to the present disclosure; and, FIG. 3 illustrates a cross-sectional view of one embodiment of a tower of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

As shown, the wind turbine 10 may also include a turbine control system or turbine controller 26 centralized within the nacelle 16. However, it should be appreciated that the turbine controller 26 may be disposed at any location on or in the wind turbine 10, at any location on the support surface 14 or generally at any other location. As will be described below with reference to FIG. 3, the turbine controller 26 may generally comprise as any suitable processing unit configured to perform the functions described herein. Thus, in several embodiments, the turbine controller 26 may include suitable computer-readable instructions that, when implemented, configure the controller 26 perform various different actions, such as transmitting and executing wind turbine control signals, receiving and analyzing sensor signals and generating message signals to provide an indication of the wear occurring on any brake pads of the wind turbine 10.

By transmitting and executing wind turbine control signals, the turbine controller 26 may generally be configured to control the various operating modes (e.g., start-up or shut-down sequences) and/or components of the wind turbine 10. For example, the controller 26 may be configured to control the yaw direction of the nacelle 16 about a yaw axis 28 to position the rotor blades 22 with respect to the direction 30 of the wind, thereby controlling the load and power output generated by the wind turbine 10. For example, as will be described below, the turbine controller 26 may be configured to transmit control signals/commands to one or more yaw drive mechanisms 32 (FIGS. 2 and 3) of the wind turbine 10 such that the nacelle 16 may be rotated about the yaw axis 28.

Referring now to FIG. 2, a simplified, internal view of one embodiment of the nacelle 16 of the wind turbine 10 is illustrated. As shown, a generator 24 may be disposed within the nacelle 16. In general, the generator 24 may be coupled to the rotor 18 of the wind turbine 10 for generating electrical power from the rotational energy generated by the rotor 18. For example, the rotor 18 may include a rotor shaft 34 coupled to the hub 20 for rotation therewith. The generator 24 may then be coupled to the rotor shaft 34 such that rotation of the rotor shaft 34 drives the generator 24. For instance, in the illustrated embodiment, the generator 24 includes a generator shaft 36 rotatably coupled to the rotor shaft 34 through a gearbox 38. However, in other embodiments, it should be appreciated that the generator shaft 36 may be rotatably coupled directly to the rotor shaft 34. Alternatively, the generator 24 may be directly rotatably coupled to the rotor shaft 34 (often referred to as a "direct-drive wind turbine").

As shown in FIGS. 2 and 3, a tower 12 of the wind turbine 10 may include an outer shell 40. The outer shell 40 may generally extend or be configured to extend from the support surface 14, and may define the yaw axis 28. Thus, an axial centerline of the outer shell 40 may extend generally along and be aligned with the yaw axis 28. The outer shell 40 may have any suitable cross-sectional shape. For example, a cross-section of the outer shell 40 may be generally circular or oval-shaped, or may have any suitable polygonal cross-sectional shape. Additionally, the outer shell 40 may be generally solid and formed from a unitary material, or may be formed from a lattice or frame-type structure which may be exposed or covered. Further, the outer shell 40 or any portion thereof, such as an upper portion 42 as shown, may be tapered. The upper portion 42 of the outer shell 40 may be the top-most portion of the outer shell 40, and may be connected to the nacelle 16 as discussed below.

Further, in some embodiments as shown in FIG. 3, a tower 12 may include an inner shell 44. The inner shell 44 may be disposed within the outer shell 40, and may extend through a portion of the outer shell 40, such as through the upper portion 42. The inner shell 44 may further similarly define the yaw axis 28, and may similarly have any suitable cross-sectional shape.

As further shown in FIGS. 2 and 3, the nacelle 16 may include a main frame 46 (also referred to as a bedplate). The main frame 46 may be the base of the nacelle 16, and may connect the nacelle 46 to the tower 12, such as to the outer shell 40 and/or inner shell 44.

As mentioned above, during operation of the wind turbine 10, the nacelle 16 may be rotated about the yaw axis 28. The nacelle 16, and the main frame 46 thereof, may thus be rotatable about the tower 12, such as about the outer shell 40 thereof. The present disclosure thus provides an advantageous arrangement of yaw bearings to provide such rotation about the yaw axis 28.

As shown in FIGS. 2 and 3, for example, a tower 12 and wind turbine 10 according to the present disclosure further includes a first yaw bearing 50 and a second yaw bearing 52. The first yaw bearing 50 and second yaw bearing 52 may comprise a yaw bearing assembly. The first yaw bearing 50 and second yaw bearing 52 each are configured to connect, and do connect the tower 12, such as the outer shell 40 and inner shell 44 thereof, to the main frame 46, as discussed below. The first yaw bearing 50 and second yaw bearing 52 are spaced apart from each other along the yaw axis 28, and are each rotatable about the yaw axis 28.

Any suitable bearing may be utilized according to the present disclosure as a first yaw bearing 50 or second yaw bearing 52. For example, a first or second yaw bearing 50, 52 may be a plain bearing, a roller bearing, a jewel bearing, a fluid bearing, a magnetic bearing, a flexure bearing, or any other suitable type of bearing. In some exemplary embodiments as shown, the first yaw bearing 50 and/or second yaw bearing 52 may be a slewing ring bearing.

Further, one embodiment of a yaw bearing according to the present disclosure, such as a first or second yaw bearing 50, 52, may include an inner race 54 and an outer race 56 as shown. A plurality of bearing balls 58 (only one of which is shown in FIG. 3) may be included in the yaw bearing. The bearing balls 58 may generally be disposed between the inner race 54 and the outer race 56. In exemplary embodiments, the inner race 54 of the yaw bearing may be rotatable with respect to the outer race 56. Alternatively, however, the outer race 56 may be rotatable with respect to the inner race 54, or both races 54, 56 may be rotatable. Further, in exemplary embodiments, the bearing balls 58 of the yaw bearing may be arranged in a single row, and the yaw bearing may thus comprise or consist of this single row of bearing balls 58. Alternatively, however, two, three, or more rows of bearing balls 58 may be included in the yaw bearing.

As discussed, the first yaw bearing 50 and second yaw bearing 52 are spaced apart from each other along the yaw axis 28, and are each rotatable about the yaw axis 28. This arrangement of the first and second yaw bearings 50, 52 may advantageously reduce the loads and better distribute the peak loads that the yaw bearings are subjected to during operation of the wind turbine 10. Further, such arrangement may allow for relatively smaller and/or inexpensive yaw bearings, because these bearings can accommodate the reduced loads. For example, the use of two yaw bearings 50, 52 that are spaced apart from each other may modify the reaction loads of the yaw bearings. During operation of the wind turbine 10, loading due to, for example, the force of wind on the rotor blades 22 may cause a moment to be applied to the yaw bearings 50, 52. A typical wind turbine 10, which includes a single yaw bearing, may typically require that the single yaw bearing reacts this moment. Further, because the single yaw bearing of typical wind turbines 10 may be located at the top of the tower 12 proximate the main frame 46 and connecting the tower 12 and main frame 46, the moment may be reacted on the yaw bearing along the yaw axis 28. As discussed, the yaw bearing that can withstand such loading may be impractical and expensive. An improved arrangement of yaw bearings according to the present disclosure, however, can redirect such reaction loads due to the moment created by loading the wind turbine 10. For example, because the first yaw bearing 50 and second yaw bearing 52 are spaced apart from each other, the reaction loads of the first and second yaw bearings 50, 52 may be perpendicular to the yaw axis, such as along a radial axis 60. Further, the reaction loads may be distributed between the first and second yaw bearings 50, 52, thus advantageously reducing the loading and peak loads on the yaw bearings 50, 52. Smaller yaw bearings 50, 52 with lesser loading limits, and that are practical and affordable, may therefore be utilized in accordance with the present disclosure.

It should be understood that, while in some embodiments the yaw bearings 50, 52 may have identical sizes, in other embodiments the sizes of the yaw bearings 50, 52 may vary with respect to each other.

The first yaw bearing 50 may connect the outer shell 40 and the main frame 46. For example, in exemplary embodiments as shown in FIG. 3, the inner race 54 of the first yaw bearing 50 may be mounted to the main frame 46, and the outer race 56 of the first yaw bearing 50 may be mounted to the outer shell 40. Mounting may be facilitated through the use of suitable mechanical fasteners, such as nut-bolt combinations, screws, nails, rivets, or other suitable mechanical fastening devices, or through a suitable adhesive, or through a suitable mounting technique such as welding or brazing. In exemplary embodiments, rotation of the first yaw bearing 50, such as rotation of the inner race 54 with respect to the outer race 56, may cause the main shell 46 to rotate with respect to the outer shell 40.

The second yaw bearing 52 may further connect the outer shell 40 and the main frame 46. For example, in exemplary embodiments as shown in FIG. 3, the inner race 54 of the second yaw bearing 52 may be mounted to the inner shell 44. The inner shell 44 may be mounted to the main frame 46. The outer race 52 of the second yaw bearing 52 may be mounted to the outer shell 40 or, in exemplary embodiments, to a bulkhead 62. The bulkhead 62 may be a support that extends, as shown, from the outer shell 40. The bulkhead 62 may be generally circumferential, having an outer cross-sectional profile that corresponds to an inner cross-sectional profile of the outer shell 40. Further, the bulkhead 62 may be formed from a single component, or may be formed from a plurality of bulkhead portions that are adjoining or spaced apart from each other. The bulkhead 62 may extend between the second yaw bearing 52 and the outer shell 40. For example, as shown, the bulkhead 62 may extend generally radially inward from the outer shell 40, such as along the radial axis 60. The bulkhead 62 may be mounted to the outer shell 40, and the outer race 56 of the second yaw bearing 52 may be mounted to the bulkhead 62. In exemplary embodiments, rotation of the second yaw bearing 52, such as rotation of the inner race 54 with respect to the outer race 56, may cause the main shell 46 to rotate with respect to the outer shell 40.

In some exemplary embodiments, the bulkhead 62 may be flexible along the yaw axis 28 and stiff along the radial axis 60. For example, as shown, the bulkhead 62 may be mounted to the outer shell 40 on one end, such that it is generally cantilevered. Such cantilevered allows the opposing end of the bulkhead 62 to move in a direction along the yaw axis 28, such that the bulkhead 62 is flexible along the yaw axis 28. Movement along the radial axis 60 may be limited, however, such that the bulkhead 62 is stiff along the radial axis 60.

It should be noted that in exemplary embodiments, the second yaw bearing 52, bulkhead 62, and at least a portion of the inner shell 44 may be disposed within the upper portion 42 of the outer shell 40.

As mentioned above, a tower 12 and wind turbine 10 according to the present disclosure may further include one or more yaw drive mechanisms 32. A yaw drive mechanism 32 may be connected to a first yaw bearing 50 or second yaw bearing 52, and may be configured to drive that bearing. A yaw drive mechanism 32 may have any suitable configuration and may include any suitable components known in the art that allow such mechanisms 32 to function as described herein. For example, as shown in FIGS. 2 and 3, each yaw drive mechanism 32 may include a yaw motor 64. The yaw motor 64 may be coupled to a yaw gear 66 (e.g., a pinion gear) configured to engage a yaw bearing, such as the outer race 56 as shown or the inner race 54. For instance, the yaw motor 64 may be coupled to the yaw gear 66 directly (e.g., by an output shaft (not shown)) or indirectly through a suitable gear assembly coupled between the yaw motor 64 and the yaw gear 66. As such, the torque generated by the yaw motor 64 may be transmitted through the yaw gear 66 and applied to a yaw bearing to permit the nacelle 16 to be rotated about the tower 12 and yaw axis 28 as discussed above. For example, the yaw gear 66 and the outer race 56 as shown or the inner race 54 may include mating teeth, threads, or splines, and mating thereof may provide such engagement and connection as discussed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A tower for a wind turbine, comprising:
   an outer shell defining a yaw axis;
   an inner shell disposed within the outer shell and extending along the yaw axis;
   a main frame for a nacelle;
   a first yaw bearing and a second yaw bearing each connecting the outer shell and the main frame, the first yaw bearing and the second yaw bearing spaced apart from each other along the yaw axis and each rotatable about the yaw axis, the first yaw bearing directly connecting the outer shell and the main frame.

2. The tower of claim 1, wherein an inner race of the second yaw bearing is mounted to the inner shell.

3. The tower of claim 1, further comprising a bulkhead extending between the second yaw bearing and the outer shell.

4. The tower of claim 3, wherein the bulkhead is flexible along the yaw axis and stiff along a radial axis.

5. The tower of claim 1, further comprising a yaw drive mechanism connected to one of the first yaw bearing or the second yaw bearing, the yaw drive mechanism configured to drive the one of the first yaw bearing or the second yaw bearing.

6. The tower of claim 1, wherein each of the first yaw bearing and the second yaw bearing comprises an inner race, an outer race, and a plurality of bearing balls.

7. The tower of claim 6, wherein the inner race of each of the first yaw bearing and the second yaw bearing is rotatable about the respective outer race.

8. The tower of claim 6, wherein the plurality of bearing balls of each of the first yaw bearing and the second yaw bearing are arranged in a single row.

9. The tower of claim 1, wherein each of the first yaw bearing and the second yaw bearing is a stewing ring bearing.

10. A wind turbine, comprising:
   a tower, the tower comprising an outer shell defining a yaw axis and an inner shell disposed within the outer shell and extending along the yaw axis;
   a nacelle, the nacelle comprising a main frame;
   a first yaw bearing and a second yaw bearing each connecting the outer shell and the main frame, the first yaw bearing and the second yaw bearing spaced apart from each other along the yaw axis and each rotatable about the yaw axis, the first yaw bearing directly connecting the outer shell and the main frame.

11. The wind turbine of claim 10, wherein an inner race of the second yaw bearing is mounted to the inner shell.

12. The wind turbine of claim 10, further comprising a bulkhead extending between the second yaw bearing and the outer shell.

13. The wind turbine of claim 10, further comprising a yaw drive mechanism connected to one of the first yaw bearing or the second yaw bearing, the yaw drive mechanism configured to drive the one of the first yaw bearing or the second yaw bearing.

14. The wind turbine of claim 10, wherein each of the first yaw bearing and the second yaw bearing comprises an inner race, an outer race, and a plurality of bearing balls.

15. The wind turbine of claim 14, wherein the inner race of each of the first yaw bearing and the second yaw bearing is rotatable about the respective outer race.

16. The wind turbine of claim 14, wherein the plurality of bearing balls of each of the first yaw bearing and the second yaw bearing are arranged in a single row.

17. The wind turbine of claim 10, wherein each of the first yaw bearing and the second yaw bearing is a slewing ring bearing.

* * * * *